INVENTOR
BRYAN E. HOUSE

Aug. 23, 1932.  B. E. HOUSE  1,872,953
BRAKE OPERATING CONNECTION
Filed Dec. 24, 1928   2 Sheets-Sheet 2
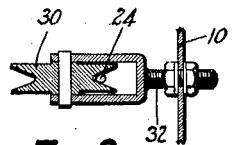
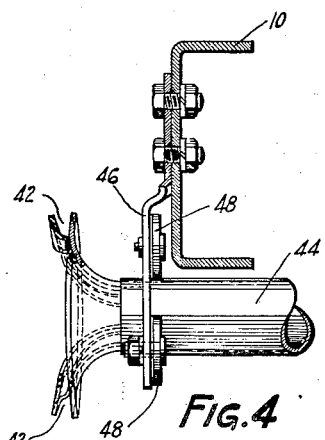
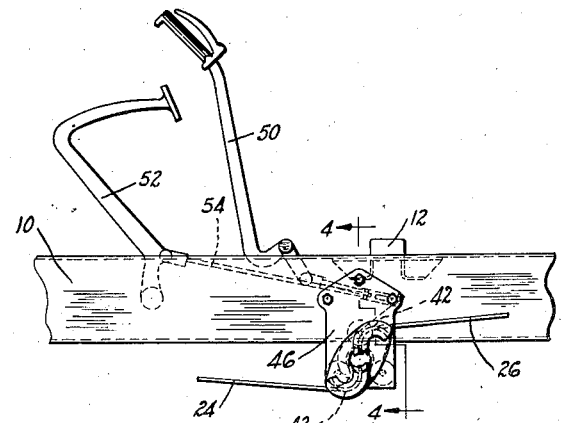
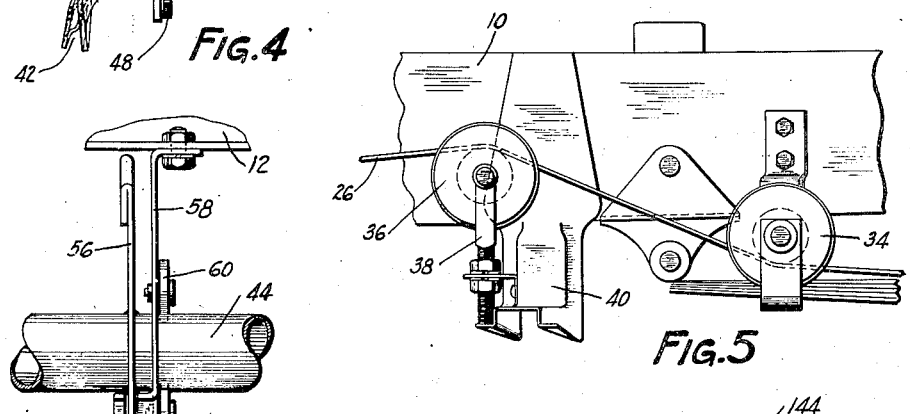
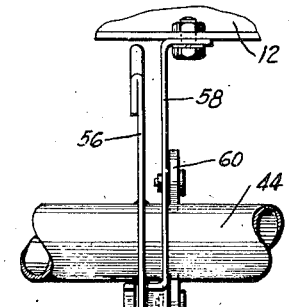
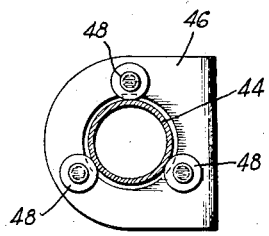
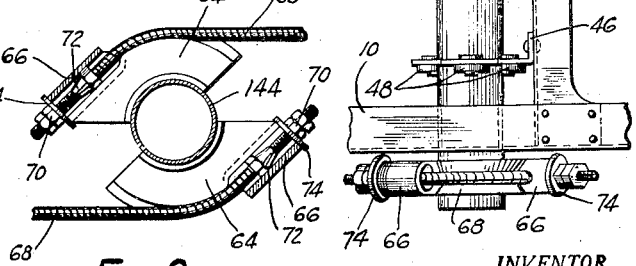
INVENTOR.
BRYAN E. HOUSE
BY
ATTORNEY Patented Aug. 23, 1932

1,872,953

UNITED STATES PATENT OFFICE

BRYAN E. HOUSE, OF SOUTH BEND, INDIANA, ASSIGNOR TO BENDIX BRAKE COMPANY, OF SOUTH BEND, INDIANA, A CORPORATION OF ILLINOIS

BRAKE-OPERATING CONNECTION

Application filed December 24, 1928. Serial No. 328,115.

This invention relates to brakes, and is illustrated as embodied in a novel system of operating connections for a set of four-wheel automobile brakes. Various features of novelty relate to operating the brakes through flexible tension elements equalized through the medium of a hollow operating shaft, to simplified means for taking up slack in the tension elements, to the mounting of the hollow shaft, and to other novel and desirable structures and arrangements which will be apparent from the following description of the illustrative constructions shown in the accompanying drawings, in which:

Figure 2 is a partial transverse vertical section, on the line 2—2 of Figure 1, showing the adjustment of one of the tension elements;

Figure 3 is a partial side elevation, looking in the direction of the arrows 3—3 in Figure 1, and showing the pedal and hand lever connections;

Figure 4 is a partial section, on the line 4—4 of Figure 3, showing one of the end bearings for the shaft;

Figure 5 is a partial side elevation, looking in the direction of the arrows 5—5 of Figure 1, and showing the means for taking up slack in the rear cable;

Figure 6 is a rear elevation of the pedal connection and its adjacent bearing;

Figure 7 is an elevation of one of the shaft bearings;

Figure 8 is an end elevation of a modified type of shaft, showing the tension elements directly connected to the shaft; and Figure 9 is a top plan view of one end of the shaft of Figure 8.

Figure 1:
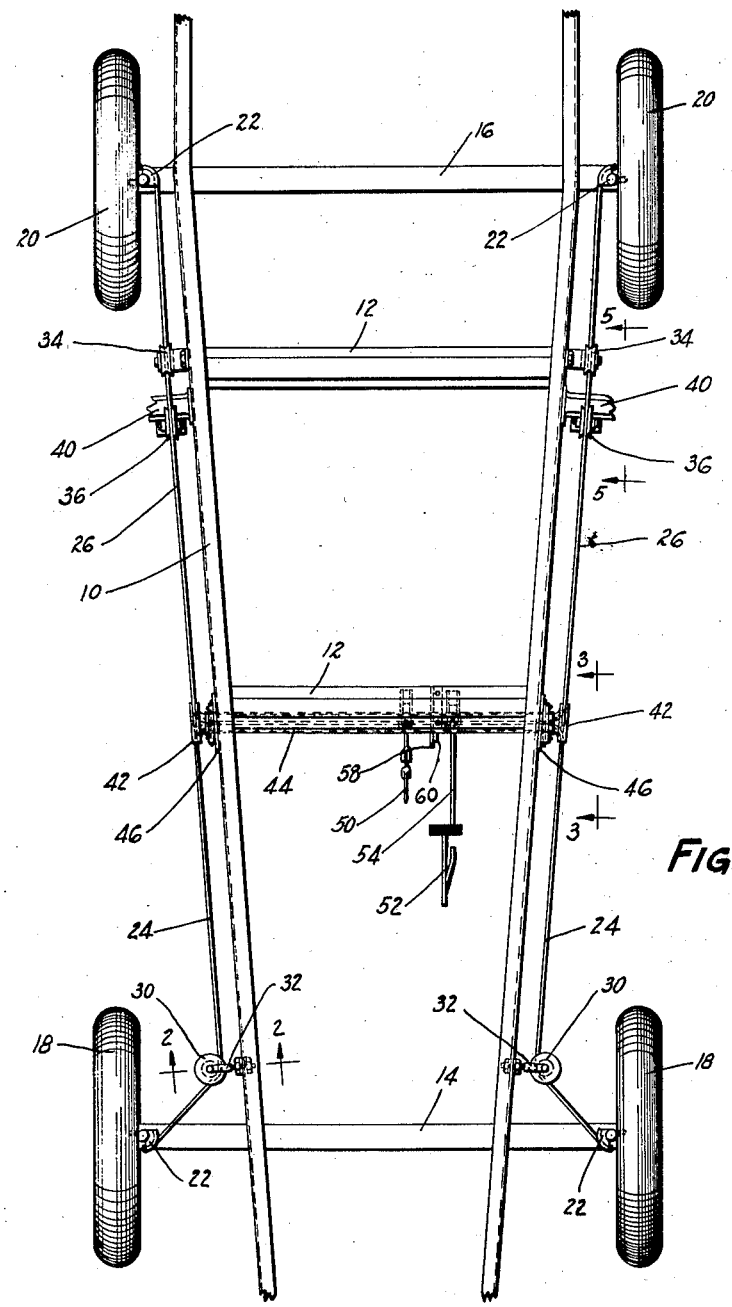
Figure 1 is a top plan view of an automobile chassis, showing the connections to the four brakes.

The particular vehicle shown in Figure 1 is an automobile chassis including a frame 10 having one or more cross members 12, and which is supported by the usual front and rear axles 14 and 16 carried by front and rear road wheels 18 and 20 having front and rear brakes (not shown). The brakes are operated by means such as the horizontal levers 22, claimed and more fully described in prior application Serial No. 306,367, the front levers having their inner ends adjacent the swiveling axes of the wheels so that the brake-operating connections do not interfere with turning the wheels in steering.

In the arrangement of Figures 1—7, the two front brake levers 22 are connected by a flexible tension element or cable 24, while the two rear levers 22 are connected by a similar but longer flexible tension element 26.

The front cable 24 passes, adjacent the rear ends of the front springs (not shown) over guides such as idler pulleys 30 secured to the frame by means such as threaded yokes 32 so that they may be adjusted to take up slack in the cable. The cable extends from the brake levers 22 inwardly and rearwardly at an angle of about 45 to the frame, until it passes over the guides 30, and then extends rearwardly along the frame.

Cable 26 passes over stationary guides such as pulleys 34 carried by the frame and arranged at such points as to neutralize the effect of the rear springs. The slack is taken up by adjustable guides or pulleys 36 having threaded yokes 38 by which they are mounted on the hangers 40 which carry the running board of the car.

Cables 24 and 26 are operated, in a manner permitting them to equalize the pressures on the opposite brakes, by being passed over grooved S-shaped arms 42 at the ends of a hollow shaft 44 through which the cables pass.

Shaft 44 is shown supported at its ends by anti-friction bearings including stamped brackets 46 secured to the frame 10 and each provided with three stamped rollers 48 embracing the shaft. A hand lever 50 is connected to a suitable lever secured on the shaft, while a pedal 52 is connected by means such as a link 54 to a stamped lever element 56 (Figure 6) encircling and welded to the shaft. In order to hold the shaft against axial movement, a portion of lever 56 is embraced by a slot in a stamped bearing bracket 58 carried by a cross member 12 and having rollers 60 embracing and supporting the shaft. This third bearing 58—60 is arranged between the pedal connection and the hand lever connection, so that even if shaft 44 or one of its end bearings should break, the brakes can still be applied.

In Figures 8 and 9 is shown a modification in which a shaft 144 has at its ends lever elements 64 formed with peripheral sleeves 66 through which pass the ends of cables 68 having adjustable stops at their ends which engage the ends of the sleeves. The stops illustrated are nuts 70 threaded on fittings 72 secured to the ends of the cables, so that they can be adjusted to take up slack in the cables, the nuts 70 resting against washers 74 which directly engage the sleeves 66.

While certain illustrative constructions have been described in detail, it is not my intention to limit the scope of the invention to those particular constructions, or otherwise than by the terms of the appended claims.

I claim:

1. A braking system for automobiles comprising a braking device, a flexible cable for operating said braking device, a fixed guide pulley for said cable, an adjustably-mounted pulley cooperating with said guide pulley for adjusting the tension of said cable, and means for exerting a brake-applying force on said cable.

2. In a vehicle having supporting springs, a frame carried thereby, a plurality of braking devices, and cables for operating said braking devices, fixed guide pulleys for said cables, said guide pulleys being carried by said frame adjacent the neutral point of said springs, and adjustable pulleys mounted on said frame adjacent said fixed pulleys and cooperating with said fixed pulleys to adjust the tension of said cables.

3. In a vehicle comprising a frame, front wheel brakes, and rear wheel brakes, the combination of cables for operating said front wheel brakes and said rear wheel brakes, a shaft, means carried by said shaft for exerting a force on said cables when said shaft is rotated, means for rotating said shaft, said last-named means comprising means cooperating with said frame for preventing axial displacement of said shaft.

4. In a vehicle comprising a frame, a plurality of braking devices, and means for operating said braking devices, a shaft journaled in said frame and cooperating with said means for actuating said braking devices, a lever on said shaft, an extension on said lever, a stop means carried by said frame and cooperating with said extension for preventing axial displacement of said shaft.

5. In a braking system comprising rear wheel brakes, front wheel brakes, and a hollow actuating shaft, a cable for actuating said rear wheel brakes, a cable for actuating said front wheel brakes, each of said cables passing through said hollow shaft, flared means attached to each end of said shaft, flanges attached to said flared means and defining guides for said cables, said flared means and said flanges also forming means for guiding said cables into said shaft.

In testimony whereof, I have hereunto signed my name.

BRYAN E. HOUSE.